C. R. SMITH.
MACHINE FOR CUTTING STALKS.
APPLICATION FILED FEB. 15, 1915.

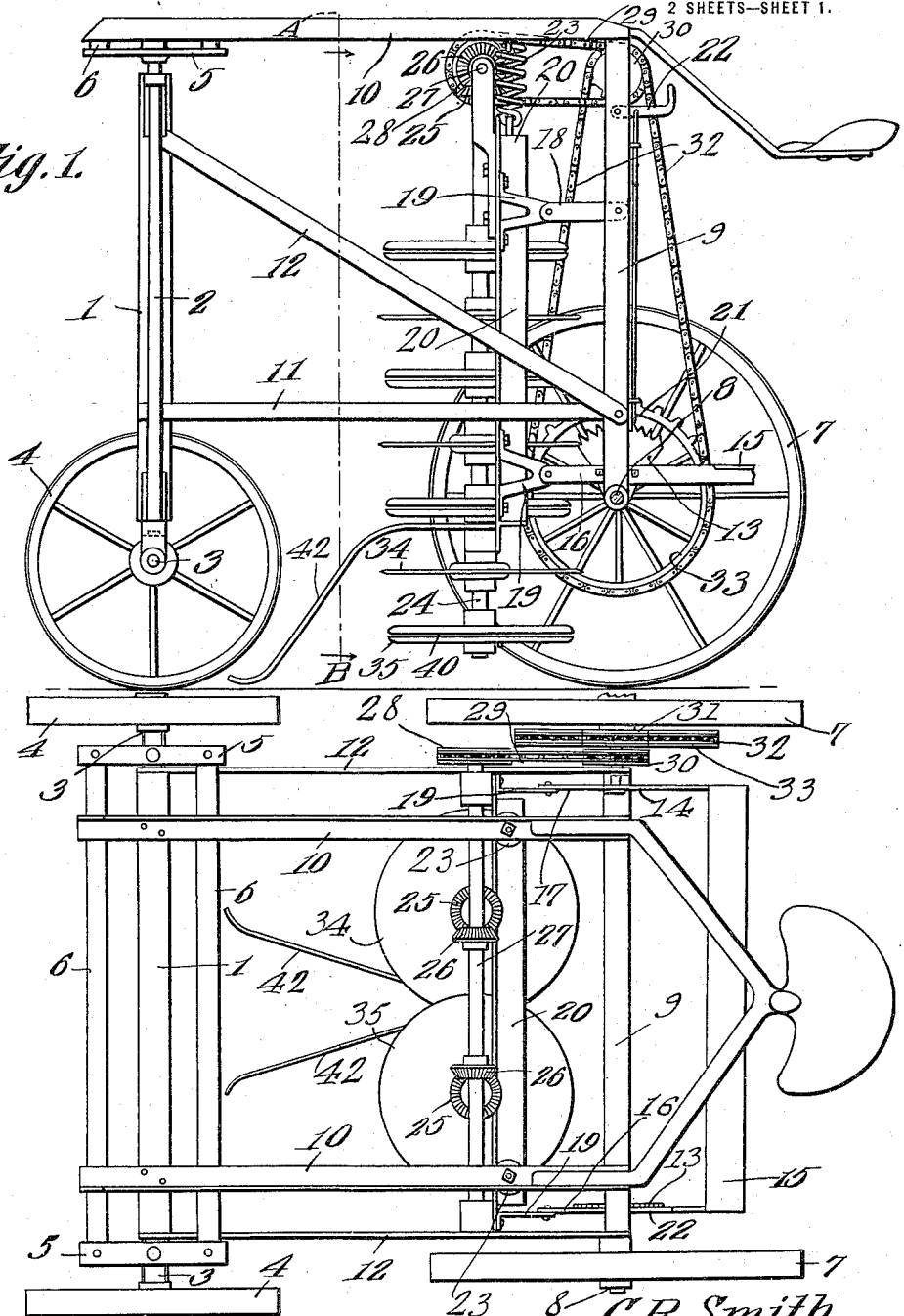

1,156,439.

Patented Oct. 12, 1915.
2 SHEETS—SHEET 2.

Witnesses

C. R. Smith, Inventor by Attorneys

UNITED STATES PATENT OFFICE.

CULLEN R. SMITH, OF PERRIS, CALIFORNIA.

MACHINE FOR CUTTING STALKS.

1,156,439. Specification of Letters Patent. Patented Oct. 12, 1915.

Application filed February 15, 1915. Serial No. 8,263.

*To all whom it may concern:*

Be it known that I, CULLEN R. SMITH, a citizen of the United States, residing at Perris, in the county of Riverside and State of California, have invented a new and useful Machine for Cutting Stalks, of which the following is a specification.

This invention relates to machines for cutting standing stalks, one object being to provide a machine designed to be propelled along a row of stalks and having opposed vertical series of cutting elements which operate during the movement of the machine to gather the stalks and sever them into sections.

A further object is to provide a machine of this character which is simple, durable and efficient and can be manipulated readily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 3:
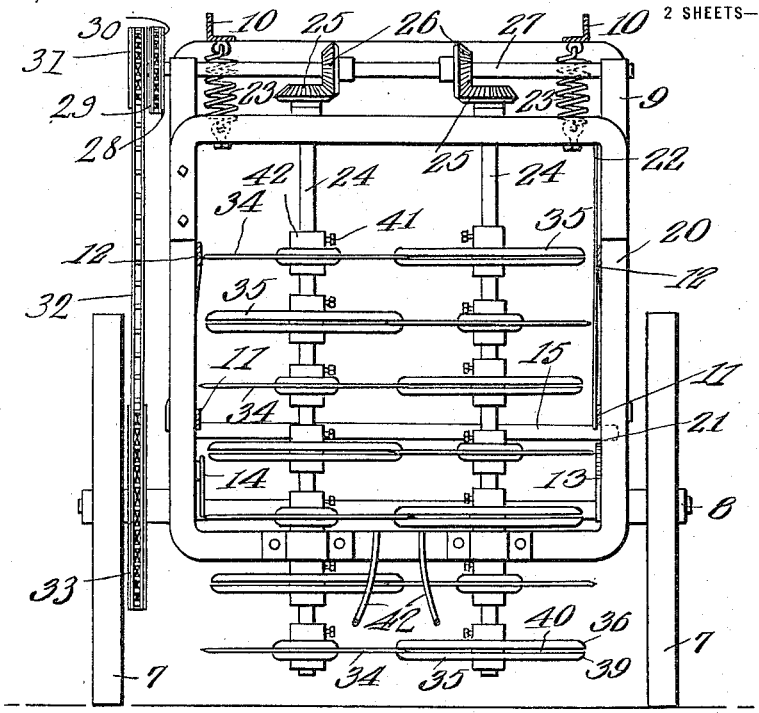
Figure 4:
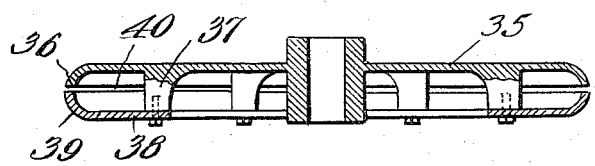
Figure 5:
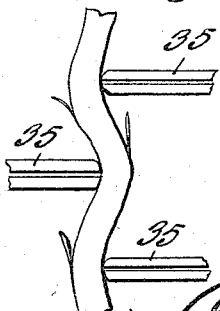

In said drawings:—Figure 1 is a side elevation of a machine embodying the present improvements. Fig. 2 is a plan view thereof. Fig. 3 is a section on line A—B Fig. 1. Fig. 4 is an enlarged section through one of the feeding disks used in connection with a cutting disk. Fig. 5 is a view showing in diagram the method of bending the stalks while being severed so that the ends of the stalk sections will not bind upon the faces of the knives during the cutting operation.

Referring to the figures by characters of reference 1 designates an arch on the sides of which are mounted vertical stems 2 connected at their lower ends to laterally extending spindles 3 on which the front or steering wheels 4 of the machine are adapted to rotate. The upper ends of the stems 2 have heads 5 connected by cross bars 6 pivoted thereto so that the wheels 4 are thus caused to turn together. Any suitable draft means, not shown, may be connected to the machine so that it can be drawn forward.

The rear wheels 7 of the machine support an axle 8 extending through the lower end of a substantially rectangular rear frame 9. This rear frame is connected to the arch 1 by longitudinal beams 10 secured upon the arch and frame and by side connections 11 and braces 12. Secured to the axle 8 adjacent one end is a toothed segment 13 and an arm 14 is secured to the axle 8 adjacent its other end, the segment and arm being adapted to rotate with the axle. Secured to the segment 13 so as to rotate therewith is a foot lever 15 formed integral with a forwardly extending arm 16 and another forwardly extending arm 17 is fixedly connected to the arm 14. Links 18 of the same length as the arms 16 and 17 are pivotally connected to the sides of the frame 9 near its upper end and these links and the arms 16 and 17 are pivotally connected to brackets 19 secured to the sides of an adjustable frame 20 mounted between the arch 1 and the frame 9 and under the beams 10. A pawl 21 is slidably mounted on one side of frame 9 and is adapted to be actuated by a lever 22. This pawl normally engages the toothed segment 13 and serves to hold the axle and, consequently, the arms 16 and 17, against rotation. Thus it will be seen that as long as the pawl is in engagement with the segment 13, the frame 20 will be supported by the arms 16 and 17 and the links 18. Springs 23 connect the top of frame 20 to the beams 10 and serve to assist in raising frame 20 when the rear end of the lever 15 is depressed.

Journaled within the upper and lower ends of the frame 20 are parallel vertical shafts 24 provided, at their upper ends, with gears 25 constantly meshing with gears 26 secured to a transverse shaft 27 carried by the frame 20. This transverse shaft has a sprocket 28 constantly engaged by an endless chain 29 which receives motion from a sprocket 30 journaled on one side of the frame 9. Another sprocket 31 is secured to and rotates with sprocket 30 and is engaged by an endless chain 32 receiving motion from a sprocket 33 rotating with one of the wheels 7.

Secured to each shaft 24 so as to rotate therewith is a series of cutting disks 34 and feeding disks 35 alternately arranged as shown. Each cutting disk is made of thin metal with a sharp periphery while each feeding disk 35 has a downturned annular flange 36 and depending bosses 37. Secured upon the lower ends of the bosses 37 is a ring 38 having an upturned annular flange 39 extending toward but spaced from the flange 36 so that a slot 40 is thus produced of sufficient size to receive the peripheral portion of one of the cutting disks 34 on the opposed shaft 24. The various disks are arranged so that each cutting disk on each shaft 24 will be directly beside and will project into the slot 40 of one of the feeding disks 35 on the other shaft 24. The several disks 34 and 35 are connected to the shafts 24 by means of set screws 41 extending through the hubs 42 of the disks and engaging the shafts. Thus it will be seen that the disks can be adjusted longitudinally of the shafts so as to produce cuts at desired distances apart.

It will be apparent that when the machine is propelled forward in any desired manner, motion will be transmitted from one of the wheels 7 through the chain 29 to shaft 27 and, consequently, the two shafts 24 will be rotated simultaneously in opposite directions respectively. Thus while the machine moves along a row which it is straddling, the stalks will be received first within the arch 1 and will finally be gathered between the oppositely rotating disks 34 and 35, which will cause the stalks to be severed where the disks 34 enter the slots 40 in the feeding disks. Thus each stalk will be severed in several places simultaneously, the parts dropping to the ground. By disengaging pawl 21 from the segment 13 and then depressing or raising the rear end of lever 15, the frame 20 can be raised or lowered to a desired elevation after which the pawl 21 can be replaced in engagement with the segment 13, thus securing the frame 20 at the desired elevation.

If desired lifting rods 42 may be connected to the lower end portion of the frame 20 and extended forwardly therefrom so as to raise any fallen stalks into position to be engaged by the cutting disks 34.

Importance is attached to the fact that when a stalk is engaged by the machine it is bent over the peripheries of the feeding disks, as shown in Fig. 5, so that when the cutting disks engage the stalks, they will cut into the convexed or outer curved faces of the stalks and the sections of the stalks will not, therefore, bind upon the upper and lower faces of the cutting disks with undesirable friction.

What is claimed is:—

A stalk cutter including a wheel supported structure adapted to straddle and move longitudinally of a row, revoluble superposed means supported by said structure for distorting the standing stalks into a waved shape, and means carried by said structure for cutting into the stalks at the outer sides of the bends thereof.

In testimony that I claim the foregoing as my own, I have hereto affixed my signature in the presence of two witnesses.

CULLEN R. SMITH.

Witnesses:
J. C. DAUCHY,
A. A. LOWERY.

Copies of this patent may be obtained for five cents each, by addressing the "Commissioner of Patents, Washington, D. C."